Patented July 22, 1930

1,771,136

UNITED STATES PATENT OFFICE

EDWARD J. MURPHY, OF BROOKLYN, NEW YORK, ASSIGNOR TO THE BARTLETT HAYWARD COMPANY, OF BALTIMORE, MARYLAND, A CORPORATION OF MARYLAND

METHOD OF PRODUCING A GAS-PURIFYING MATERIAL

No Drawing. Application filed December 6, 1923, Serial No. 679,007. Renewed December 26, 1929.

My invention relates to the production of a purification medium for the removal of impurities from gases. More specifically, my invention relates to the treatment of materials, such as ores, containing as the principal constituent iron oxide, to confer upon the latter an increased capacity to remove impurities such as hydrogen sulfide from gases.

Various gases such as producer gas, water gas, coal gas, illuminating gas, and fuel gas, contain as an impurity, hydrogen sulfide. It is usually necessary and desirable before using these gases to remove the hydrogen sulfide. It has been proposed to accomplish the same by passing the gases through a purification medium such as natural occurring or artifically produced iron oxide after it has been subjected to treatment to modify its physical and chemical characteristics. As far as I am aware, these original products are deficient in their capacity to remove hydrogen sulfide.

I have found that by reducing ores, for example those found in the Lake Superior region, to a very fine state of division and thereafter heating the same as hereinafter set forth, the capacity of the iron oxide to remove hydrogen sulfide is greatly increased. It is desired to point out that the fineness of the material and the heat treatment both contribute towards increasing the capacity of the oxide to remove hydrogen sulfide. For the best results it has been found that the oxide should be reduced to two hundred mesh and then heated preferably to between 200° and 400° C. Iron oxide which has been reduced to one hundred mesh and heated to 200° C. shows a fair removal capacity. However, at 300° C. this is greatly increased and at 400° C. the capacity is still greater. Iron oxide which has been reduced to two hundred mesh and heated to between 300° C. and 400° C. shows a still greater capacity for the removal of hydrogen sulfide than that which has been reduced only to one hundred mesh and subjected to the same heat-treatment.

For the preparation of the iron oxide, I proceed as follows: The ore is first dried, if necessary, to such a moisture content as to permit convenient feeding to a pulverizer where it is crushed and pulverized to about two hundred mesh. Any suitable pulverizer may be used. Thereafter, the reduced material is passed through a kiln, preferably of the rotary type, and heated to between 300° C. and 400° C. for a period sufficient to confer upon the iron oxide what may be termed "super-activity". Obviously the time of the heat treatment will vary somewhat with the different ores. When using certain ores, from the Lake Superior region, heat treatment for a period of five minutes is satisfactory. The ore is withdrawn from the kiln, allowed to cool, and slightly dampened with water. The ore which may be stored until used, is adapted for use in liquid purification of gases. For example, a 3% suspension of the ore in water furnishes an admirable gas-purification medium. If dry purification material is desirable, it is only necessary to reduce to one hundred mesh, as the material ground more finely would tend to cause fires when used in dry purifiers.

The following results were obtained by reducing iron oxide to the mesh stated and then subjecting the resulting product to heat treatment. Kunberger's method was used for determining the absorption of hydrogen sulphide. This consists of passing hydrogen sulphide gas through a weighed quantity of the treated ore mixed with sawdust and noting the percentage of absorption of hydrogen sulphide by weight.

*Buffalo ore, Lake Superior District—Iron oxide ($Fe_2O_3$) 65.15%*

FOULING TESTS

[Material reduced to 100 mesh]

| Temp. of treatment—heating—(min.) | Not heated | 200° C. 5 | 300° C. 5 | 400° C. 5 |
|---|---|---|---|---|
| | Per cent | Per cent | Per cent | Per cent |
| Fouling No. 1—$H_2S$ absorbed | 11.31 | 16.97 | 22.24 | 25.53 |
| Fouling No. 2—$H_2S$ absorbed | 20.82 | 31.26 | 29.74 | 28.80 |
| Fouling No. 3—$H_2S$ absorbed | 22.54 | 26.21 | 32.03 | 33.76 |
| Fouling No. 4—$H_2S$ absorbed | 24.18 | 31.92 | 35.43 | 34.58 |
| Total $H_2S$ absorbed | 78.85 | 106.35 | 119.44 | 122.67 |

*Beaver ore, Lake Superior District—*
*Iron oxide 76.73%*

FOULING TESTS

[Material reduced to 100 mesh]

| Temp. of treatment—heating—(min.) | Not heated | 300° C. 5 | 400° C. 5 |
|---|---|---|---|
| | Per cent | Per cent | Per cent |
| Fouling No. 1—H₂S absorbed | 2.54 | 8.39 | 14.38 |
| Fouling No. 2—H₂S absorbed | 3.82 | 12.06 | 17.23 |
| Fouling No. 3—H₂S absorbed | 8.92 | 17.83 | 21.34 |
| Fouling No. 4—H₂S absorbed |  | 24.68 | 25.78 |
| Total H₂S absorbed |  | 62.96 | 78.73 |

*Georgia ochre—Iron oxide 49.60%*

FOULING TESTS

[Material reduced to 100 mesh]

| Temp. of treatment—heating—(min.) | Not heated | 200° C. 5 | 400° C. 5 |
|---|---|---|---|
| | Per cent | Per cent | Per cent |
| Fouling No. 1—H₂S absorbed | 1.78 | 8.51 | 20.85 |
| Fouling No. 2—H₂S absorbed | 4.23 | 14.34 | 24.59 |
| Fouling No. 3—H₂S absorbed |  | 18.80 | 25.57 |
| Total H₂S absorbed |  | 41.65 | 71.01 |

From the above it is clear that by heating ores containing iron oxide which have been reduced to one hundred mesh, they become more active in their capacity to remove hydrogen sulfide.

The following tests show the effect of reducing to two hundred mesh and subjecting the ore to heat treatment:

*Buffalo ore—Iron oxide 65.15%*

FOULING TESTS

[Material reduced to 200 mesh]

| Temp. of treatment—time of heating in minutes | Not heated | 300° C. 5 | 400° C. 5 |
|---|---|---|---|
| | Per cent | Per cent | Per cent |
| Fouling No. 1—H₂S absorbed | 24.43 | 39.64 | 47.56 |
| Fouling No. 2—H₂S absorbed | 32.21 | 44.10 | 31.80 |
| Fouling No. 3—H₂S absorbed | 31.82 | 36.89 | 31.05 |
| Fouling No. 4—H₂S absorbed | 21.37 | 23.73 | 30.21 |
| Total H₂S absorbed | 109.83 | 144.36 | 140.62 |

The results set forth in the above table indicate the importance of fine grinding and subsequent heat treatment on the activity of the ore. As further indicating that heat treatment alone is not sufficient to confer upon the ore a high capacity to remove hydrogen sulfide, the following results are set forth:

*Buffalo ore—Iron oxide 65.15%*

FOULING TESTS

[Material reduced to 20 mesh]

| Temp. of treatment—time of heating in minutes | Not heated | 300° C. 5 | 400° C. 5 |
|---|---|---|---|
| | Per cent | Per cent | Per cent |
| Fouling No. 1—H₂S absorbed | 11.48 | 15.86 | 14.86 |
| Fouling No. 2—H₂S absorbed | 8.54 | 11.86 |  |

In comparison with materials heretofore used for gas purification my material may be termed "superactive", and it is intended by the use of this term in the claims to distinguish from the materials of ordinary activity well known in the art.

What is claimed is:

1. The method of preparing a gas purification material super-active in its capacity to remove hydrogen sulfide from gases comprising reducing to two hundred mesh a material containing as its principal constituent iron oxide, and heating to at least 200° C. to increase the activity of the material.

2. The method of preparing a gas purification material super-active in its capacity to remove hydrogen sulfide from gases comprising reducing to two hundred mesh a material containing as its principal constituent iron oxide, and heating to between 200° C. and 400° C.

3. As a new product, a gas purification medium comprising a material containing as its principal constituent iron oxide, which has been reduced to two hundred mesh and heated to above 200° C., and an aqueous carrying-vehicle therefor.

4. As a new product, a gas purification medium comprising a material containing as its principal constituent iron oxide, which has been reduced to two hundred mesh and heated to 400° C., and an aqueous carrying-vehicle therefor.

In testimony whereof I have signed my name to this specification.

EDWARD J. MURPHY.